(12) United States Patent
Sood et al.

(10) Patent No.: US 7,921,463 B2
(45) Date of Patent: Apr. 5, 2011

(54) METHODS AND APPARATUS FOR PROVIDING AN INSERTION AND INTEGRITY PROTECTION SYSTEM ASSOCIATED WITH A WIRELESS COMMUNICATION PLATFORM

(75) Inventors: Kapil Sood, Beaverton, OR (US); Travis T. Schluessler, Hillsboro, OR (US); Christopher Lord, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1033 days.

(21) Appl. No.: 11/239,976

(22) Filed: Sep. 30, 2005

(65) Prior Publication Data

US 2007/0076885 A1    Apr. 5, 2007

(51) Int. Cl.
*G06F 7/04* (2006.01)
*G06F 7/20* (2006.01)

(52) U.S. Cl. ......... 726/26; 707/697; 707/698; 707/699; 380/259; 380/270; 380/283; 713/170; 713/176; 713/181

(58) Field of Classification Search .......... 719/321–327; 713/181; 726/26; 707/698
See application file for complete search history.

(56) References Cited

U.S. PATENT DOCUMENTS

| | | | |
|---|---|---|---|
| 6,212,635 B1 * | 4/2001 | Reardon | 713/165 |
| 6,813,259 B1 * | 11/2004 | Kumar et al. | 370/338 |
| 7,089,426 B1 * | 8/2006 | Bagshaw | 713/193 |
| 2002/0112152 A1 * | 8/2002 | VanHeyningen et al. | 713/151 |
| 2002/0196181 A1 * | 12/2002 | Fall | 342/357.06 |
| 2004/0103278 A1 * | 5/2004 | Abhishek et al. | 713/160 |
| 2004/0215874 A1 * | 10/2004 | Kikuchi et al. | 711/112 |
| 2004/0218527 A1 * | 11/2004 | Schwartz | 370/230 |
| 2005/0076287 A1 * | 4/2005 | Mantong | 714/758 |
| 2005/0172119 A1 * | 8/2005 | Eckhardt et al. | 713/160 |
| 2005/0232161 A1 * | 10/2005 | Maufer et al. | 370/252 |
| 2005/0256975 A1 * | 11/2005 | Kaniz et al. | 709/250 |
| 2005/0289311 A1 * | 12/2005 | Durham et al. | 711/163 |
| 2006/0041820 A1 * | 2/2006 | Hang et al. | 714/758 |
| 2006/0075259 A1 * | 4/2006 | Bajikar et al. | 713/189 |
| 2006/0090116 A1 * | 4/2006 | Gallagher et al. | 714/758 |
| 2008/0059811 A1 * | 3/2008 | Sahita et al. | 713/194 |
| 2008/0091857 A1 * | 4/2008 | McDaniel | 710/72 |

OTHER PUBLICATIONS

David M. Durham, et al. "Notifying Remote Adminstrator of Platform Integrity Determination", U.S. Appl. No. 10/865,354, filed Jun. 9, 2004.
David M. Durham, et al. "System and Method for Secure Inter-PLatform and Intra-Platform Communications", U.S. Appl. No. 10/881,777, filed Jun. 29, 2004.
Travis Schluessler, et al. "Signed Manifest for Run-Time Verification of Software Program Identity and Integrity", U.S. Appl. No. 11/173,851, filed Jun. 30, 2005.
Uday Savagaonkar, et al. "Generating and Communicating Information on Locations of Program Sections in Memory", U.S. Appl. No. 11/173,587, filed Jun. 30, 2005.

* cited by examiner

*Primary Examiner* — Taghi T Arani
*Assistant Examiner* — Thaddeus Plecha
(74) *Attorney, Agent, or Firm* — Schwabe, Williamson & Wyatt, P.C.

(57) ABSTRACT

Embodiments of methods and apparatus for providing an insertion and integrity protection system associated with a wireless communication platform are generally described herein. Other embodiments may be described and claimed.

30 Claims, 5 Drawing Sheets

METHODS AND APPARATUS FOR PROVIDING AN INSERTION AND INTEGRITY PROTECTION SYSTEM ASSOCIATED WITH A WIRELESS COMMUNICATION PLATFORM

TECHNICAL FIELD

The present disclosure relates generally to wireless communication systems, and more particularly, to methods and apparatus for providing an insertion and integrity protection system associated with a wireless communication platform.

BACKGROUND

As wireless communication becomes more and more popular at offices, homes, schools, etc., protection of data traffic is critical to ensure the security and provide optimal performance of wireless environments. Without such protection, wireless communication platforms may be susceptible to security threats such as denial of service (DoS) attacks. For example, malicious components such as worms may modify buffers and/or insert illegal packets into transmit queues, which may be transmitted over the air by a network interface device to propagate across networks. Thus, authentication of data traffic may provide data integrity for wireless environments.

DETAILED DESCRIPTION

In general, methods and apparatus for providing an insertion and integrity protection system for a wireless communication platform are described herein. The methods and apparatus described herein are not limited in this regard.

Figure 1:
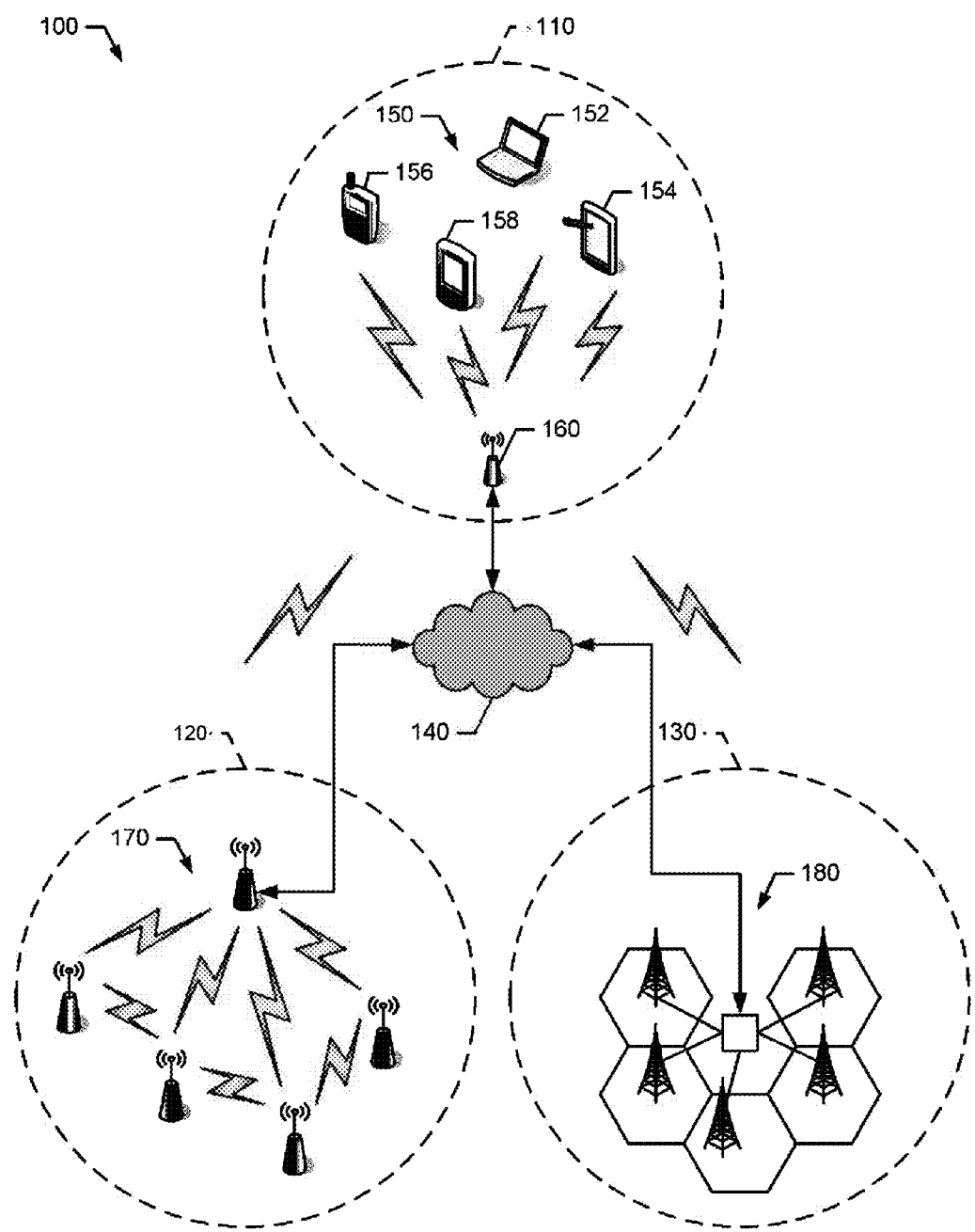
FIG. 1 is a schematic diagram representation of an example wireless communication system according to an embodiment of the methods and apparatus disclosed herein.

Referring to FIG. 1, an example wireless communication system 100 including one or more wireless communication networks, generally shown as 110, 120, and 130, is described herein. The wireless communication networks 110, 120, and 130 may be operatively coupled to a common public or private network 140 such as the Internet, a telephone network, a local area network (LAN), a cable network, and/or another wireless network via connection to an Ethernet, a digital subscriber line (DSL), a telephone line, a coaxial cable, and/ or any wireless connection, etc. As described in further detail below, the wireless communication networks 110, 120, and 130 may be implemented to provide a wireless personal area network (WPAN), a wireless local area network (WLAN), a wireless metropolitan area network (WMAN), a wireless wide area network (WWAN), and/or other suitable wireless communication networks.

In one example, the wireless communication system 100 may include one or more basic service set (BSS) networks, generally shown as 110. The BSS network 110 may include one or more stations 150, generally shown as 152, 154, 156, and 158. For example, a station associated with the BSS network may be a wireless electronic device such as a laptop computer, a handheld computer, a tablet computer, a cellular telephone (e.g., a smart phone), a pager, an audio and/or video player (e.g., an MP3 player or a DVD player), a gaming device, a digital camera, a navigation device (e.g., a GPS device), a wireless peripheral (e.g., a headset, a keyboard, a mouse, etc.), a medical device (e.g., a heart monitor, a blood pressure monitor, etc.) and/or other suitable fixed, portable, or mobile electronic devices.

The stations 150 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate via wireless links. In one example, the laptop 152 may implement OFDM modulation to transmit large amounts of digital data by splitting a radio frequency signal into multiple small sub-signals, which in turn, are transmitted simultaneously at different frequencies. In particular, the laptop 152 may use OFDM modulation as described in the 802.xx family of standards developed by the Institute of Electrical and Electronic Engineers (IEEE) and/or variations and evolutions of these standards (e.g., 802.11x, 802.15, 802.16x, etc.) to communicate via wireless links. For example, the laptop 152 may operate in accordance with the 802.16 family of standards developed by IEEE to provide for fixed, portable, and/or mobile broadband wireless access (BWA) networks (e.g., the IEEE std. 802.16, published 2004).

The stations 150 may also use direct sequence spread spectrum (DSSS) modulation (e.g., the IEEE std. 802.11b) and/or frequency hopping spread spectrum (FHSS) modulation (e.g., the IEEE std. 802.11). Although the above examples are described above with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.). For example, the stations 150 may also operate in accordance with other suitable wireless communication protocols that require very low power such as Bluetooth®, Ultra Wideband (UWB), and/or radio frequency identification (RFID) to communicate via wireless links.

Alternatively, the stations 150 may communicate via wired links (not shown). For example, the stations 150 may use a serial interface, a parallel interface, a small computer system interface (SCSI), an Ethernet interface, a universal serial bus (USB) interface, a high performance serial bus interface (e.g., IEEE 1394 interface), and/or any other suitable type of wired interface to communicate.

The BSS network may also include one or more access points (AP), generally shown as 160. One or more of the stations 150 may communicate with the AP 160. The AP 160 may be operatively coupled to the common public or private network 140.

In addition to the BSS network 110, the wireless communication system 100 may include other communication networks. In one example, the wireless communication system 100 may include a wireless mesh network 120. The wireless mesh network 120 may be an extended service set (ESS) mesh network based on developments by IEEE. The wireless mesh network 120 may include a plurality of mesh nodes 170. For example, the plurality of mesh nodes 170 may include access points, redistribution points, end points, and/or other suitable connection points for traffic flows via mesh paths having multiple hops. The AP 160 of the BSS network 110 may operate as one of the plurality of mesh nodes 170 of the wireless mesh network 120 (e.g., a mesh AP) or vice versa. Thus, the mesh AP may be a part of the BSS network 110 and the wireless mesh network 120. Although FIG. 1 depicts five mesh nodes, the wireless mesh network 120 may include additional or fewer mesh nodes.

In addition to the BSS network 110 and the wireless mesh network 120, the wireless communication system 100 may include other communication networks. For example, the wireless communication system 100 may also include one or more radio access networks (RANs) such as a cellular radio network, generally shown as 130. The RAN 130 may include one or more base stations, generally shown as 180, and other radio components necessary to provide wireless communication services. The base stations 180 may operate in accordance with the applicable standard(s) for providing wireless communication services. That is, the base stations 180 may be configured to operate in accordance with one or more of several wireless communication protocols.

In particular, the wireless communication protocols may be based on analog, digital, and/or dual-mode communication system standards that use multiple access techniques such as orthogonal frequency division multiple access (OFDMA), frequency division multiple access (FDMA), time division multiple access (TDMA), and/or code division multiple access (CDMA). For example, the wireless communication protocols may include Global System for Mobile Communications (GSM), Wideband CDMA (W-CDMA), General Packet Radio Services (GPRS), Enhanced Data GSM Environment (EDGE), Universal Mobile Telecommunications System (UMTS), High-Speed Downlink Packet Access (HSDPA), variations and evolutions of these standards, and/or other suitable wireless communication standards.

Further, the wireless communication system 100 may include other WPAN devices, WLAN devices, WMAN, and/or WWAN devices such as network interface devices and peripherals (e.g., network interface cards (NICs)), APs, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system (not shown). Accordingly, the wireless communication system 100 may be implemented to provide WPANs, WLANs, WMANs, WWANs, and/or other suitable wireless communication networks. Although certain examples have been described above, the scope of coverage of this disclosure is not limited thereto.

Figure 2:
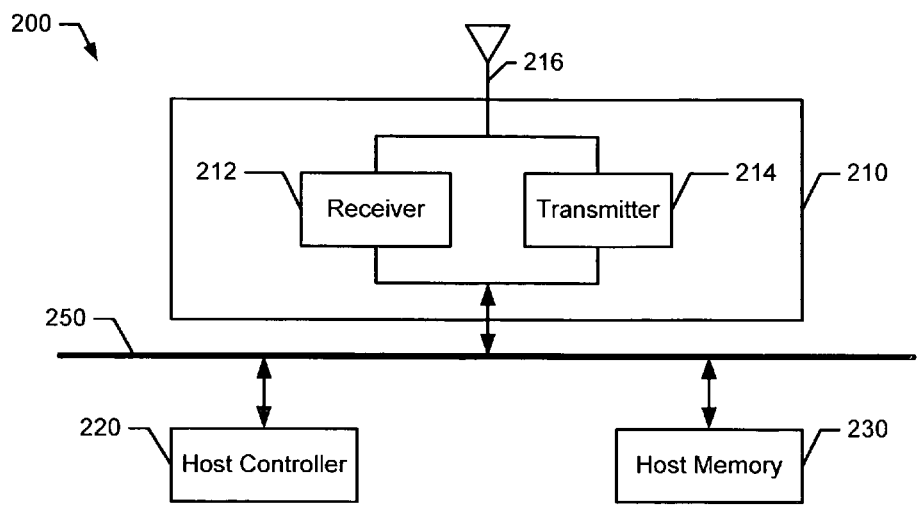
FIG. 2 is a block diagram representation of an example wireless communication platform.

In the example of FIG. 2, a wireless communication platform 200 may include a communication interface 210, a host controller 220, and a host memory 230. For example, the wireless communication platform 200 may be implemented in a wireless electronic device such as a laptop computer, a handheld computer, a tablet computer, a desktop computer, a cellular telephone (e.g., a smart phone), a pager, an audio and/or video player (e.g., an MP3 player or a DVD player), a gaming device, a digital camera, a navigation device (e.g., a GPS device), a wireless peripheral (e.g., a headset, a keyboard, a mouse, etc.), a medical device (e.g., a heart rate monitor, a blood pressure monitor, etc.), and/or other suitable fixed, portable, or mobile electronic devices. Although FIG. 2 depicts components of the wireless communication platform 200 coupling to each other via a bus 250, these components may be operatively coupled to each other via other suitable direct or indirect connections (e.g., a point-to-point connection).

The communication interface 210 may include a receiver 212, a transmitter 214, and an antenna 216. The communication interface 210 may receive and/or transmit data traffic via a wireless link (not shown). The antenna 216 may be one or more directional or omni-directional antennas including, for example, dipole antennas, monopole antennas, patch antennas, loop antennas, microstrip antennas, or other types of antennas suitable for transmission of radio frequency (RF) signals. Although FIG. 2 depicts a single antenna, the wireless communication platform 200 may include additional antennas. For example, the wireless communication platform 200 may include a plurality of antennas to implement a multiple-input-multiple-output (MIMO) system.

In general, the host controller 220 (e.g., via applications) may generate protocol data units (PDUs) such as data frames and store the PDUs in the host memory 230. The host controller 220 may indicate to the communication interface 210 to read the PDUs from the host memory 230. The communication interface 210 may retrieve the PDUs from the host memory 230. Accordingly, the communication interface 210 may encrypt and transmit the PDUs via a wireless link.

While the components shown in FIG. 2 are depicted as separate blocks within the wireless communication platform 200, the functions performed by some of these blocks may be integrated within a single semiconductor circuit or may be implemented using two or more separate integrated circuits. For example, although the receiver 212 and the transmitter 214 are depicted as separate blocks within the communication interface 210, the receiver 212 may be integrated into the transmitter 214 (e.g., a transceiver). The methods and apparatus described herein are not limited in this regard.

Figure 3:
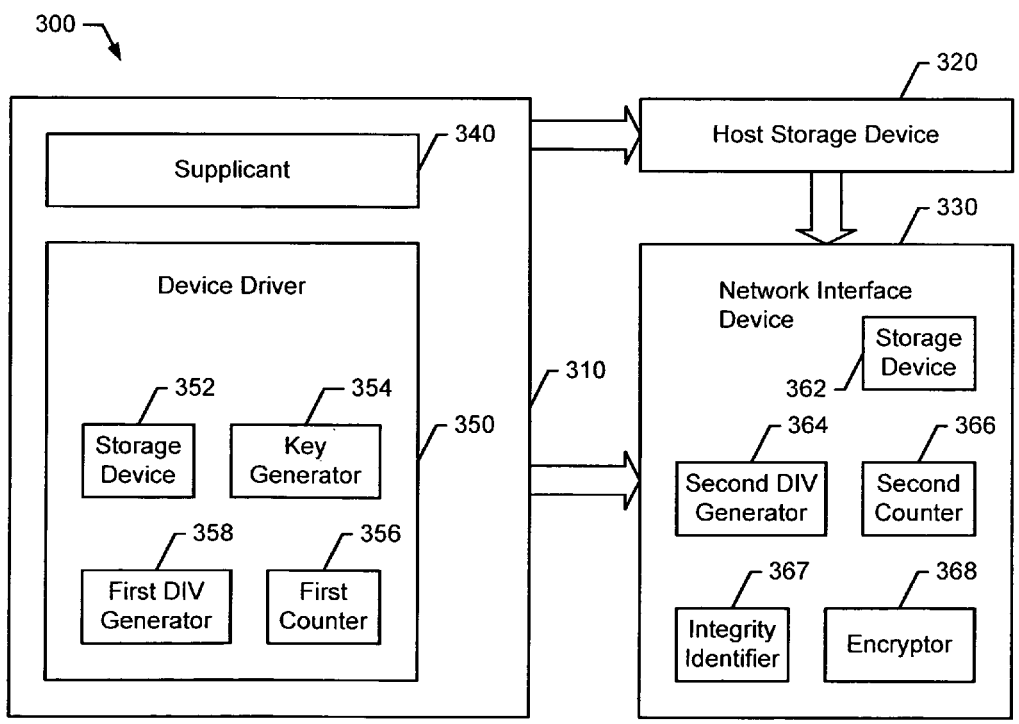
FIG. 3 is a block diagram representation of an example insertion and integrity protection system of the example wireless communication platform of FIG. 2.

Turning to FIG. 3, for example, an insertion and integrity protection system 300 may include a host controller 310, a host storage device 320, and a network interface device 330. In one example, the insertion and integrity protection system 300 may operate in accordance with a wireless communication protocol as described in, for example, the IEEE std. 802.11i (published 2003). As described in detail below, the insertion and integrity protection system 300 may protect PDUs (e.g., data frames) from various attacks by malicious components such as worms. In one example, the insertion and integrity protection system 300 may protect a PDU as the host controller 310 generates the PDU from plaintext and prior to the network interface device 330 encrypting and transmitting the PDU.

In general, the host controller 310 may manage encryption keys and protect data traffic to the network interface device 330. For example, the host controller 310 may be an operating system (OS) and/or a virtual machine (VM). The host controller 310 may include a supplicant 340 and a device driver 350. In one example, the supplicant 340 may operate in accordance with the IEEE std. 802.1X, which provides an authentication framework for WLANs. The supplicant 340 may request access to an authenticator (not shown), which may be located at an AP (e.g., the AP 150 of FIG. 1).

The device driver 350 may include a local storage device 352, a key generator 354, a first counter 356, and a first data integrity value (DIV) generator 358. The local storage device 352 may store insertion and integrity protection information including encryption keys and/or sequence values to share with the network interface device 330. The key generator 354 may generate the encryption keys. In one example, the supplicant 340 and the key generator 354 may perform a four-way handshake session in accordance with the IEEE std. 802.11i to generate pairwise transient keys (PTKs). The first counter 356 may generate the sequence values (e.g., sequence numbers). As described in detail below, the first DIV generator 358 may generate a first DIV associated with each data frame from applications of the host controller 310.

The host storage device 320 may store data from the host controller 310. In particular, the storage device 320 may store data frames from the device driver 350, which may indicate to the network interface device 330 to read the data frames from the host storage device 320. For example, the host storage device 320 may be a host memory such as the host memory 230 of FIG. 2.

In general, the network interface device 330 may encrypt and transmit data frames. For example, the network interface device 330 may be a network interface card (NIC) and/or any other suitable application-specific integrated circuits (ASIC). The network interface device 330 may include hardware and/or firmware to provide communication services in a WPAN, WLAN, WMAN, and/or WWAN. In particular, the network interface device 330 may include a local storage device 362, a second DIV generator 364, a second counter 366, an integrity identifier 367, and an encryptor 368.

The local storage device 362 may store insertion and integrity protection information including encryption keys and/or sequence values from the device driver 350 of the host controller 310. In one example, the local storage device 362 may include one or more first-in-first-out (FIFO) buffers (e.g., a ring buffer). In another example, the local storage device 362 may include one or more transmit/receive queues with one or more independent queues for each transmit/receive packets. The second DIV generator 364 may generate a second DIV associated with each data frame from the host storage device 320. The second counter 366 may generate the sequence values. The integrity identifier 367 may identify a condition indicative of integrity of each data frame based on the first and second DIVs. The encryptor 368 may encrypt each data frame prior to transmission.

While the components shown in FIG. 3 are depicted as separate blocks within the insertion and integrity protection system 300, the functions performed by some of these blocks may be integrated within a single semiconductor circuit or may be implemented using two or more separate integrated circuits. Further, although FIG. 3 depicts particular components within the insertion and integrity protection system 300, the methods and apparatus described herein may include other suitable components and/or may not necessarily include all of the components shown within the insertion and integrity protection system 300. In one example, the insertion and integrity protection system 300 may include two or more VMs (not shown). The device driver 350 may operate on a first VM (e.g., the host controller 310), and a second VM may communicate directly with the host storage device 320 and/or the network interface device 330. The first and second VMs may communicate with each other. Thus, the device driver 350 may communicate with the host storage device 320 and/or the network interface device 330 via the second VM. In another example, the network interface device 330 may not include the encryptor 368. The methods and apparatus described herein are not limited in this regard.

As described in detail below, the methods and apparatus described herein may protect data traffic in transit between the device driver 350 to the network interface device 330 from illegal modifications and/or illegal insertions. Although the above examples are described with respect to data frames, the methods and apparatus described herein may be implemented for other suitable PDUs. For example, the methods and apparatus described herein may be implemented to other types of wireless frames (e.g., management and/or control frames), packets, datagrams, etc. The methods and apparatus described herein are not limited in this regard.

Figure 4:
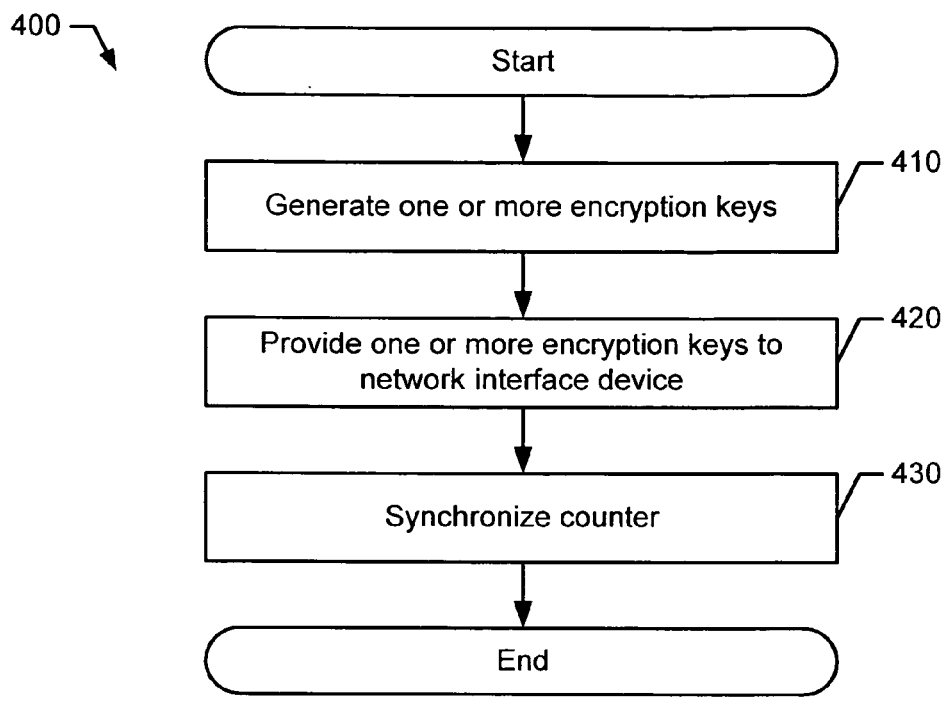
FIGS. 4 and 5 are flow diagram representations of one manner in which an example device driver may be configured to support the example insertion and integrity protection system of FIG. 3.
Figure 5:
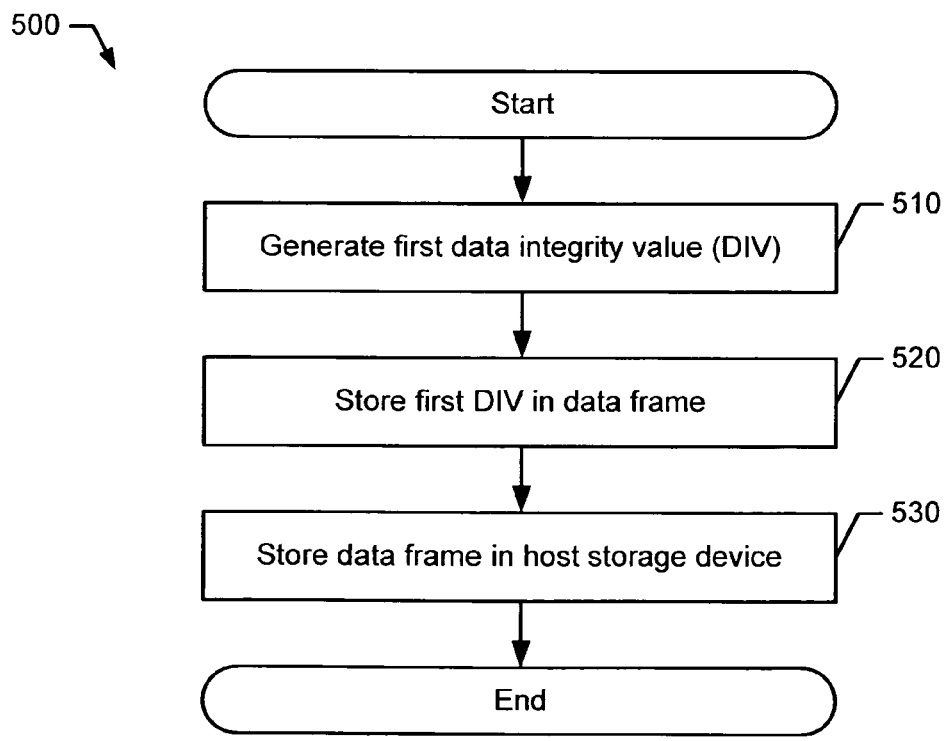
Figure 6:
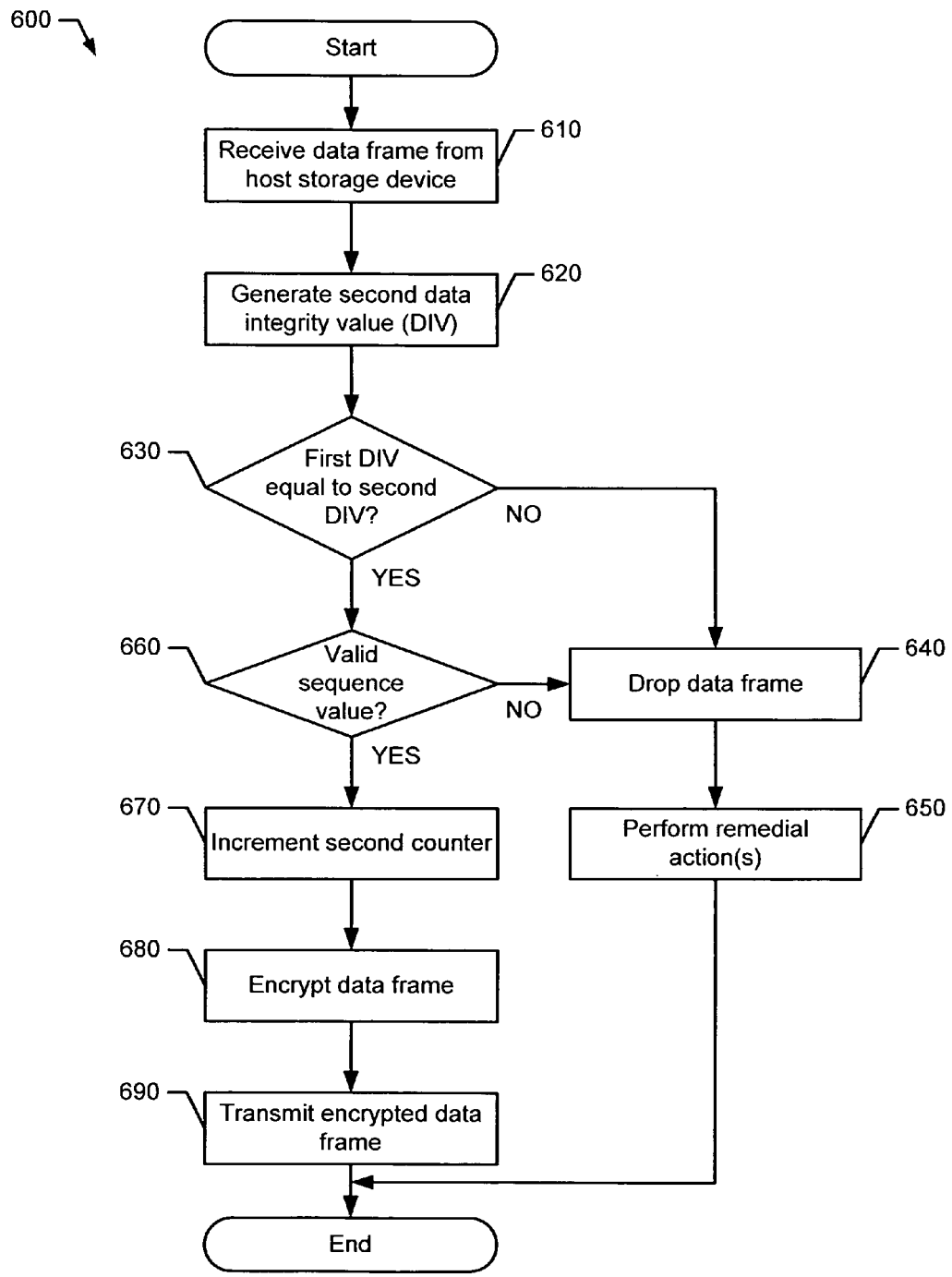
FIG. 6 is a flow diagram representation of one manner in which an example network interface device may be configured to support the example insertion and integrity protection system of FIG. 3.

FIGS. 4, 5, and 6 depict one manner in which the example insertion and integrity protection system 300 of FIG. 3 may be configured to operate. The example processes 400, 500, and/or 600 may be implemented as machine-accessible instructions utilizing any of many different programming codes stored on any combination of machine-accessible media such as a volatile or nonvolatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Further, although particular orders of actions are illustrated in FIGS. 4, 5, and 6, these actions may be performed in other temporal sequences. Again, the example processes 400, 500, and 600 are merely provided and described in conjunction with the apparatus of FIGS. 1, 2, and 3 as an example of one way to provide an insertion and integrity protection system associated with a wireless communication platform.

In the example of FIG. 4, the process 400 may begin with the supplicant 340 and the device driver 350 (e.g., via the key generator 354) generating one or more encryption keys (block 410). In one example, the supplicant 340 and the device driver 350 may perform a four-way handshake in accordance with the EEE std. 802.11i (or another suitable negotiation session with an AP) to generate one or more PTKs based on a pairwise master key (PMK). For example, the PMK may be an authorization token (e.g., a large random number) to enforce access control decisions. Accordingly, the PTKs may be stored in the local storage device 352.

To protect the PTKs, the device driver 350 may operate in accordance with a system management mode (SMM). In particular, the PTKs may be stored in a system management RAM (SMRAM), which may be inaccessible to the host controller 310. Thus, the PTKs may be hidden from other applications running on the host controller 310. In one example, malicious components may not be able to access the PTKs if access to the PTKs is restricted based on an execution address of the code initiating a system management interrupt (SMI) (e.g., a valid device driver such as the device driver 350). Alternatively, the PTKs may be hidden by using code-obfuscation mechanisms. For example, the underlying code path of the PTKs may be hidden by self-modifying code or code that may difficult to reverse-engineer and/or to trace with debugging mechanisms.

Although the above example describes using PTKs in accordance with EEE std. 802.11i, the methods and apparatus described herein may use other suitable encryption keys.

For example, the device driver 350 may operate in accordance with an authentication and key management (AKM) process and/or other suitable key management protocols to generate one or more encryption keys.

The device driver 350 may provide the encryption keys to the network interface device 330 (block 420). In particular, the network interface device 330 may store the encryption keys in the local storage device 362. The device driver 350 may also synchronize the first and second counters 356 and 366 (block 430). For example, each of the first and second counters 356 and 366 may be a temporary key integrity protocol (TKIP) sequence counter (TSC) or a packet number (PN) counter in accordance with a counter mode with cipher block chaining (CBC)-message authentication code (MAC) protocol (CCMP). The device driver 350 may also synchronize any other suitable sequence counters used and shared between the host controller 310 and the network interface device 330.

Alternatively, the device driver 350 may include a random number generator (RNG) (not shown) instead of a sequence counter. In particular, the device driver 350 and the network interface device 330 may use an identical RNG method. For example, the device driver 350 may generate a seed before and/or during block 420 and communicate the seed to the network interface device 330, or vice versa in which the network interface device 330 may generate the seed and communicate the seed to the device driver 350. As a result, the device driver 350 and the network interface device 330 may share encryption keys and sequence values (e.g., sequence numbers). The methods and apparatus described herein are not limited in this regard.

Based on the encryption keys as described above, the device driver 350 may provide insertion and integrity protection to a data frame. Turning to FIG. 5, for example, the process 500 may begin with the device driver 350 (e.g., via the first DIV generator 358) generating a first DIV associated with a data frame (block 510). For example, the device driver 350 may receive the data frame from an application of the host controller 310. In particular, the device driver 350 may use an integrity protection algorithm such as a secure-keyed hash algorithm (SHA) (e.g., hash message authentication code (HMAC)-SHA-1, HMAC-SHA-256, HMAC-SHA-512, SHA-1, SHA-256, or SHA-512), an algorithm in accordance with CCMP for Advanced Encryption Standard (AES), and/or other suitable algorithms to provide integrity protection for the data frame.

The first DIV generator 358 may generate the first DIV based on the integrity protection algorithm, the sequence values, and immutable bit fields of the data frame. Briefly, the integrity protection algorithm may include sequence values to compute the first DIV. In particular, the sequence values may be used to detect illegal insertions of data frames by worms and/or viruses. The sequence values may increment by one after each use by the first DIV generator 358. An immutable bit field may include a bit that should not change states after the bit is initialized by the application and/or the driver that created the bit. To calculate the first DIV, all mutable bit fields of the data frame may be zeros.

The device driver 350 may store the first DIV in the data frame (block 520). In particular, the first DIV may be stored in the message integrity check (MIC) field of the data frame. If the first DIV includes a number of bits more than a number of bits allowed in the MIC field, the device driver 350 may truncate the lower order bits of the first DIV. Alternatively, the device driver 350 may use a separate, one-way cryptographic compression function to further compress the number of bits associated with the first DIV. Otherwise if the first DIV includes a number of bits less than the number of bits allowed by the MIC field, the device driver 350 may place the first DIV in the highest order bits of the MIC field. By storing the first DIV in the MIC field of the data frame, the insertion and integrity protection system 300 may reduce additional memory needed for the data frame. Although the above example describes storing the first DIV in the MIC field, the methods and apparatus described herein may store the first DIV in other suitable fields and/or memory.

Accordingly, the device driver 350 may store the data frame including the first DIV in the host storage device 320 (block 530). As noted above, the host storage device 320 may be a host memory that may be read by the network interface device 330. The network interface device 330 may retrieve and process the data frame as described in detail below. The methods and apparatus described herein are not limited in this regard.

Referring to FIG. 6, for example, the process 600 may begin with the network interface device 330 receiving a data frame from the host storage device 320 (block 610). In one example, the network interface device 330 may retrieve (e.g., read) the data frame from the host storage device 320. Alternatively, the host storage device 320 may automatically forward the data frame to the network interface device 330.

Based on the PTKs and the sequence values from the device driver 350 and stored in the local storage device 362, the network interface device 330 (e.g., via the second DIV generator 364) may generate a second DIV associated with the data frame (block 620). The second DIV generator 364 may generate the second DIV in a manner similar to the manner described above for the first DIV generator 358 to generate the first DIV. In particular, the second counter 366 may also keep track of sequence values of data frames so that the network interface device 330 may detect illegal data frames. For example, the sequence value of a current data frame from the host storage device 320 is one greater than the sequence value of a previous data frame from the host storage device 320 may indicate that the current data frame may be a legal or valid data frame.

The network interface device 330 (e.g., via the integrity identifier 367) may identify a condition indicative of integrity associated with the data frame from the host storage device 320 by comparing the first DIV to the second DIV (block 630). If the first DIV does not equal to the second DIV at block 630, the network interface device 330 may drop or discard the data frame from the host storage device 320 (block 640). With the first DIV being different from the second DIV, the network interface device 330 may determine that the data frame is illegal and/or invalid. In particular, an illegal or invalid data frame (e.g., a malware data frame) may be a data frame from viruses, worms, rogue drivers, and/or other invalid sources. By dropping illegal or invalid data frames, the network interface device 330 may prevent various types of denial-of-service (DoS) attacks on or virus/worm distributions to one or more network(s). The network interface device 330 may also detect duplicate data frames originating from an illegal source. As a result, the network interface device 330 may conserve power by not transmitting illegal or invalid data frames.

The network interface device 330 may perform remedial actions (block 650). In one example, the network interface device 330 may generate an event report or log (block 670). The event report or log may be used to alert the device driver 350 and/or a system management module associated with the host controller 310. The network interface device 330 may generate an event report or log even if the data frame is legal or valid (e.g., authentic). For example, the network interface device 330 may generate an event report or log to indicate that the data frame is legal or valid.

Further, the network interface device 330 may take other suitable remedial actions. In one example, the network interface device 330 may transmit a notification or an alert to a remote management console associated with a network that may communicate with the network interface device 330. The network interface device 330 may also terminate (e.g., shut down) network traffic to and/or from a current network, and use an alternate network until the illegal or invalid activities have been resolved. Alternatively, the rate of network traffic may be controlled (e.g., reduced or slowed down) so that the illegal or invalid activities may be corrected by an administrator while service may still be available to an end user. By reducing the rate of network traffic, for example, the effect of a worm may be reduced to provide time for the administrator to respond. Although particular examples of remedial actions are described above, the methods and apparatus described herein may include other suitable remedial actions.

Referring back to block 630, if the first DIV is equal to the second DIV, the network interface device 330 (e.g., via the integrity identifier 367) may determine whether the sequence value of the data frame is valid (block 660). In one example, the network interface device 330 may compare a sequence number of a data frame to a sequence number of the last valid data frame. The sequence number of the data frame is valid if the sequence number of the data frame is greater than the sequence number of the last valid data frame by one. By determining whether the sequence value of the data frame is valid, the network interface device 330 may provide insertion protection. For example, the network interface device 330 may determine whether malicious components such as worms inserted invalid data frames directly into the local storage device 362 (e.g., ring buffer). If the sequence value is not valid at block 660, control may proceed directly to block 640 to process the data frame as described above.

Otherwise if the sequence value is valid at block 660, the network interface device 330 may increment the second counter 366 (block 670). For example, the network interface device 330 may increment the sequence number of the second counter 366 by one. Prior to transmission of the data frame, the network interface device 330 (e.g., via the encryptor 368) may encrypt the data frame (block 680). With a valid sequence value and the first DIV equal to the second DIV, the network interface device 330 may verify that the data frame is from a valid device driver and has not been tampered with en route from the device driver 350. Accordingly, the network interface device 330 may transmit the encrypted data frame from block 680 via a wireless link (block 690). In one example, the network interface device 330 may transmit the encrypted data frame to one or more APs (e.g., the AP 150 of FIG. 1). The methods and apparatus described herein are not limited in this regard.

Although the above examples described in connection with FIGS. 4, 5, and 6 depict particular actions, the methods and apparatus described herein may include other suitable actions and/or may not necessarily include all of these actions. In one example, the process 600 may include perform remedial actions such as transmitting a notification or an alert to a remote management console. In another example, the process 600 may not include block 680. The methods and apparatus described herein are not limited in this regard.

While the above examples are described with respect to data frames, the methods and apparatus described herein may be implemented to other suitable PDUs (e.g., packets, datagrams, etc.). Further, although the above examples are described with respect to a WLAN, the methods and apparatus described herein may be implemented to provide an insertion and integrity protection system associated with wireless communication platforms of other wireless communication networks. In one example, the methods and apparatus described herein may be implemented to provide an insertion and integrity protection system associated with wireless communication platforms of WPAN, WMAN, and/or WWAN.

Figure 7:
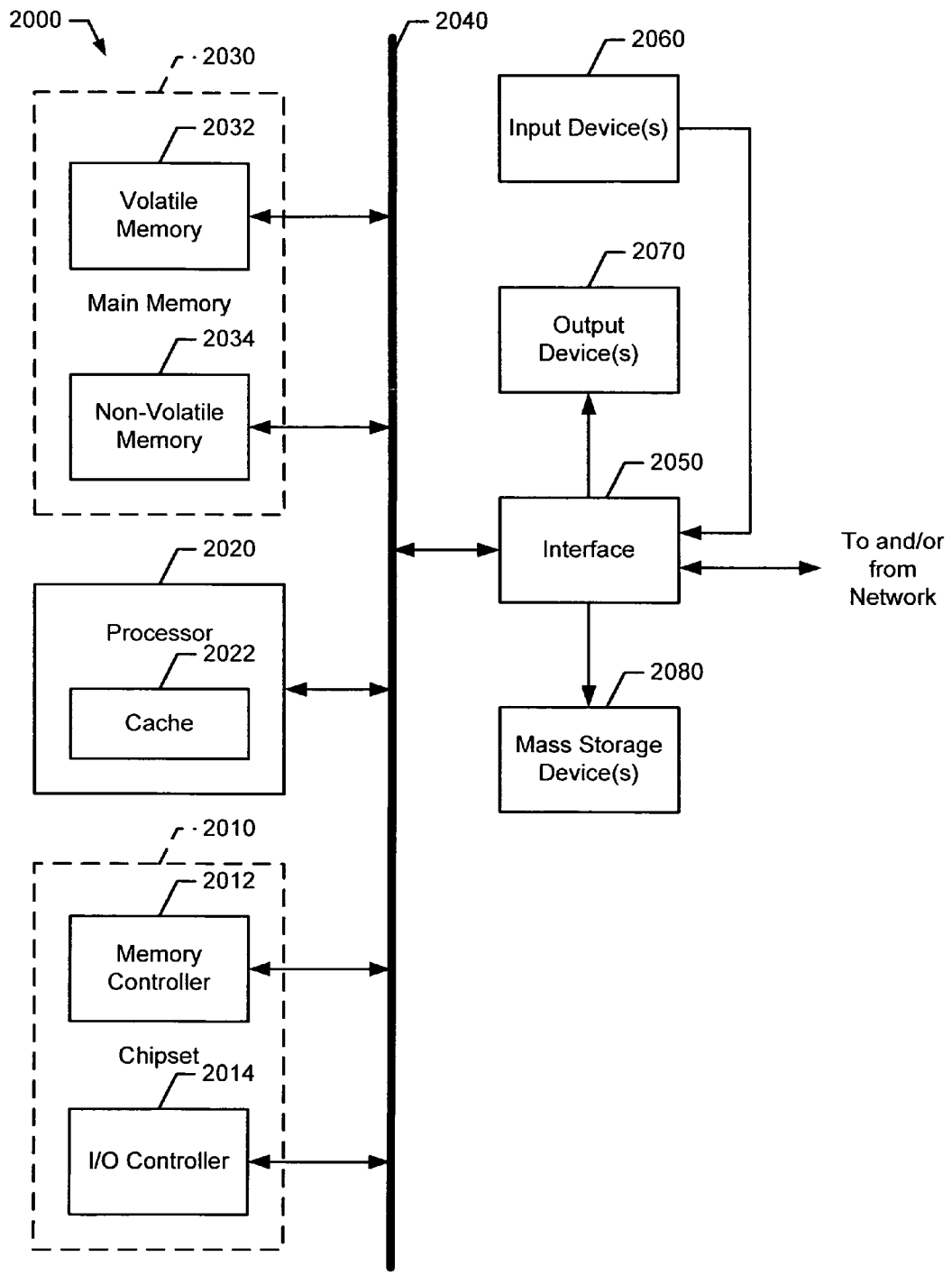
FIG. 7 is a block diagram representation of an example processor system that may be used to implement the example wireless communication platform of FIG. 2.

FIG. 7 is a block diagram of an example processor system 2000 adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 7 includes a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WLAN components, WMAN components, WWAN components, and/or other suitable processing components. For example, the processor 2020 may be implemented using one or more of the Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output interface (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 7 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:
performing a handshake exchange between a wireless supplicant of a host controller and a network interface device driver of the host controller to produce one or more integrity protection information, wherein the host controller resides in a wireless communication node, and wherein the one or more integrity protection information is not accessible to applications operating on the host controller other than the network interface device driver, wherein the one or more integrity protection information is based on one or more encryption keys;
generating a first data integrity value of a protocol data unit (PDU) at the network interface device driver, wherein the first data integrity value is based on the one or more integrity protection information;
storing the first data integrity value in a message integrity check field of the PDU;
providing the one or more integrity protection information and the PDU, separately, to a network interface device operatively coupled to the network interface device driver, wherein the network interface device resides in the wireless communication node;
generating a second data integrity value of the PDU at the network interface device based on the one or more integrity protection information provided to the network interface device;
comparing the first data integrity value of the PDU and the second data integrity value of the PDU at the network interface device;
identifying a condition indicative of integrity of the PDU based on the comparison of the first and second data integrity values; and
transmitting the PDU through the network interface device if the condition indicative of integrity is met.

2. A method as defined in claim 1 further comprising generating the first data integrity value at the network interface device driver based further on one or more sequence values, and providing the one or more encryption keys to the network interface device.

3. A method as defined in claim 1 further comprising storing the PDU in a host storage device accessible by the network interface device.

4. A method as defined in claim 1 further comprising synchronizing one or more sequence counters associated with the network interface device driver and the network interface device.

5. A method as defined in claim 1 further comprising discarding the PDU in response to identifying an illegal condition or an invalid condition associated with the PDU based on at least one of a condition of a sequence value associated with the PDU or comparison of the first and second data integrity values.

6. A method as defined in claim 1 further comprising performing a remedial action based on the condition, wherein the remedial action comprises at least one of generating one of an event report or an event log, transmitting a notification to a management console, terminating network traffic associated with a network, or controlling rate of the network traffic.

7. An article of manufacture comprising:
a non-transitory storage medium; and
a plurality of programming instructions stored on the storage medium, which, in response to execution of the plurality of programming instructions by a computing device, cause the computing device to:
perform a handshake exchange between a wireless supplicant of a host controller and a network interface device driver of the host controller to produce one or more integrity protection information, wherein the host controller resides in the computing device, and wherein the one or more integrity protection information is not accessible to applications operating on the host controller other than the network interface device driver, wherein the one or more integrity protection information is based on one or more encryption keys;
generate a first data integrity value of a protocol data unit (PDU) at the network interface device driver of the computing device, wherein the first data integrity value is based on the one or more integrity protection information, and wherein the PDU includes the first data integrity value in a message integrity check field of the PDU;
provide the one or more integrity protection information and the PDU, separately, to a network interface device operatively coupled to the network interface device driver, wherein the network interface device resides in the computing device;

generate a second data integrity value of the PDU at the network interface device based on the one or more integrity protection information provided to the network interface device;

compare the first data integrity value and the second data integrity value of the PDU at the network interface device,;

identify a condition indicative of integrity of the data traffic based on the comparison of the first and second data integrity values; and transmit the PDU through the network interface device if the condition indicative of integrity is met.

8. An article of manufacture as defined in claim 7, wherein the plurality of programming instructions configured to program a computing device to generate the first data integrity value at the network interface device driver based further on one or more sequence values, and provide the one or more encryption keys to the network interface device.

9. An article of manufacture as defined in claim 7, wherein the plurality of programming instructions configured to program a computing device to generate the second data integrity value at the network interface device based on one or more encryption keys generated by the network interface device driver and one or more sequence values synchronized by the network interface device driver.

10. An article of manufacture as defined in claim 7, wherein the plurality of programming instructions configured to program a computing device to retrieve the PDU from a host storage device accessible by the network interface device.

11. An article of manufacture as defined in claim 7, wherein the plurality of programming instructions configured to program a computing device to encrypt the PDU and transmit the PDU via a wireless link in response to identifying one of a legal condition or a valid condition of integrity of the PDU based on a condition of a sequence value associated with the PDU and comparison of the first and second data integrity values.

12. An article of manufacture as defined in claim 7, wherein the plurality of programming instructions configured to program a computing device to discard the PDU in response to identifying one of an illegal condition or an invalid condition of integrity of the PDU based on at least one of a condition of a sequence value associated with the PDU or comparison of the first and second data integrity values.

13. An article of manufacture as defined in claim 7, wherein the plurality of programming instructions configured to program a computing device to perform a remedial action based on the condition, and wherein the remedial action comprises at least one of generating one of an event report or an event log, transmitting a notification to a management console, terminating network traffic associated with a network, or controlling rate of the network traffic.

14. An apparatus comprising: a network interface device driver of a wireless station configured to generate a first data integrity value of a protocol data unit (PDU), wherein the first data integrity value is based on one or more integrity protection information generated from a handshake exchange between a wireless supplicant of a host controller of the wireless station and the network interface device driver, wherein the network interface device driver reside in the host controller, wherein the one or more integrity protection information is based on one or more encryption keys generated by the network interface device driver and is not accessible to applications operating on the host controller other than the network interface device driver, and wherein the PDU includes the first data integrity value in a message integrity check field of the PDU; and a network interface device residing in the wireless station and operatively coupled to the network interface device driver, and configured to:

obtain the one or more integrity protection information and the PDU separately from the network interface device driver, generate a second data integrity value of the PDU based on the one or more integrity protection information separately obtained by the network interface device, compare the first and second data integrity values, identify a condition indicative of integrity of the PDU based on comparison of the first and second data integrity values, and transmit the PDU if the condition indicative of integrity is met.

15. An apparatus as defined in claim 14, wherein the network interface device driver is configured to generate the first data integrity value based further on one or more sequence values, and to provide the one or more encryption keys to the network interface device.

16. An apparatus as defined in claim 14, wherein the network interface device driver is configured to store the PDU in a host storage device accessible by the network interface device.

17. An apparatus as defined in claim 14, wherein the network interface device driver is configured to synchronize one or more sequence counters associated with the network interface device driver and the network interface device.

18. An apparatus as defined in claim 14, wherein the network interface device is configured to generate the second data integrity value based further on one or more sequence values synchronized by the network interface device driver.

19. An apparatus as defined in claim 14, wherein the network interface device is configured to encrypt the PDU and transmit the PDU via a wireless link in response to identifying a legal condition or a valid condition associated with the PDU based on a condition of a sequence value associated with the PDU and comparison of the first and second data integrity values.

20. An apparatus as defined in claim 14, wherein the network interface device is configured to discard the PDU in response to identifying one of an illegal condition or an invalid condition associated with the PDU based on at least one of a condition of a sequence value associated with the PDU or comparison of the first and second data integrity values.

21. An apparatus as defined in claim 14, wherein the network interface device is configured to perform a remedial action based on the condition, and wherein the remedial action comprises at least one of generating one of an event report or an event log, transmitting a notification to a management console, terminating network traffic to a network, or controlling rate of the network traffic.

22. A system comprising:

a processor;

a network interface device driver operatively coupled to the processor and configured to generate a first data integrity value of a protocol data unit (PDU), wherein the first data integrity value is based on one or more integrity protection information generated from a handshake exchange between a wireless supplicant of a host controller of the system and the network interface device driver, wherein the one or more integrity protection information is based on one or more encryption keys generated by the processor and is not accessible to applications operating on the host controller other than the network interface device driver, and wherein the PDU includes the first data integrity value in a message integrity check field of the PDU;

a network interface card operatively coupled to the processor and the network interface device driver, and configured to:

obtain the one or more integrity protection information and the PDU separately from the processor, generate a second data integrity value of the PDU based on the one or more integrity protection information separately obtained by the network interface device, compare the first and second data integrity values, identify a condition indicative of integrity of the PDU based on the comparison of the first and second data integrity values, and transmit the PDU if the condition indicative of integrity is met; and an omni-directional antenna operatively coupled to the network interface card.

23. A system as defined in claim 22, wherein the network interface card is configured to retrieve the PDU from a host memory, and wherein the PDU includes the first data integrity value in a message integrity check field.

24. A system as defined in claim 22, wherein the network interface card is configured to generate the second data integrity value based further on one or more sequence values synchronized by the processor.

25. A system as defined in claim 22, wherein the network interface card is configured to encrypt the PDU and transmit the PDU via a wireless link in response to identifying a legal condition or a valid condition associated with the PDU based on a condition of a sequence value associated with the PDU and comparison of the first and second data integrity values.

26. A system as defined in claim 22, wherein the network interface card is configured to discard the PDU in response to identifying one of an illegal condition or an invalid condition associated with the PDU based on at least one of a condition of a sequence value associated with the PDU or comparison of the first and second data integrity values.

27. A system as defined in claim 22, wherein the network interface card is configured to perform a remedial action based on the condition, and wherein the remedial action comprises at least one of generating one of an event report or an event log, transmitting a notification to a management console, terminating network traffic to a network, or controlling rate of the network traffic.

28. A method as defined in claim 1, further comprising generating the first data integrity value at the network interface device driver based on one or more immutable bit fields of a PDU.

29. A method as defined in claim 1, further comprising protecting the one or more integrity protection information by storing the one or more integrity protection information at a volatile memory area where access to the one or more integrity protection information is granted to the network interface device driver via a system management interrupt (SMI).

30. A method as defined in claim 1, further comprising storing the one or more integrity protection information in a local storage device of the network interface device.

* * * * *